United States Patent
Li (10) Patent No.: US 6,661,780 B2
(45) Date of Patent: Dec. 9, 2003

(54) MECHANISMS FOR POLICY BASED UMTS QOS AND IP QOS MANAGEMENT IN MOBILE IP NETWORKS

(75) Inventor: Man Li, Bedford, MA (US)

(73) Assignee: Nokia Corporation, Espoo (FI)

( * ) Notice: Subject to any disclaimer, the term of this patent is extended or adjusted under 35 U.S.C. 154(b) by 55 days.

(21) Appl. No.: 10/013,409

(22) Filed: Dec. 7, 2001

(65) Prior Publication Data

US 2003/0108015 A1 Jun. 12, 2003

(51) Int. Cl.$^7$ ................................................ H04Q 7/00
(52) U.S. Cl. ...................................... 370/324; 370/466
(58) Field of Search ............................ 370/351, 352–3, 370/310, 328, 329, 330, 331, 465, 466, 468, 469, 474

(56) References Cited

U.S. PATENT DOCUMENTS

| | | | | |
|---|---|---|---|---|
| 6,104,929 | A | * 8/2000 | Josse et al. | .................. 455/445 |
| 6,292,891 | B1 | * 9/2001 | Bergenwall et al. | ......... 713/151 |
| 6,385,451 | B1 | * 5/2002 | Kalliokulju et al. | ......... 455/437 |
| 6,429,808 | B1 | * 8/2002 | King et al. | ............. 342/357.02 |
| 6,434,133 | B1 | * 8/2002 | Hamalainen | ................. 370/338 |
| 6,490,451 | B1 | * 12/2002 | Denman et al. | ............ 455/436 |
| 6,545,992 | B2 | * 4/2003 | Naqvi et al. | ................. 370/335 |
| 6,577,712 | B2 | * 6/2003 | Larsson et al. | .......... 379/88.17 |

FOREIGN PATENT DOCUMENTS

WO    WO 99/48310    * 9/1999    ............ H04Q/7/22

OTHER PUBLICATIONS

3GPP TS 23.107, "QoS Concept and Architecture", v3.5.0, Dec. 2000.
RFC 2475, "An Architecture for Differentiated Services", Dec. 1998.
RFC 2748, "The COPS (Common Open Policy Service) Protocol", Jan. 2000.
3GPP TS 23.207, "End to End QoS Concept and Architecture", V1.7.3., Jun. 2001.

* cited by examiner

*Primary Examiner*—David Vincent
(74) *Attorney, Agent, or Firm*—Jamie L. Wiegand; Darby & Darby P.C.

(57) ABSTRACT

Mechanisms for QoS mapping rules on a mobile network between a UMTS layer and an IP layer are provided. A policy server is coupled to the SGSNs and GGSNs on the mobile network and maintains a centralized location for layer QoS mapping on the mobile network. Three mapping mechanisms have been provided, including an out-sourcing mechanism, a provisioning mechanism, and a hybrid mechanism. The out-sourcing mechanism uses the policy server to handle PDP context events and supply the appropriate rules to the appropriate support node. Under the provisioning mechanism, the policy server pushes down the corresponding mapping rules to each support node across the network in advance of any PDP context event. The hybrid mechanism utilizes a combination of the out-sourcing mechanism and the provisioning mechanism. The mechanisms ensure consistent UMTS layer QoS to IP layer QoS mapping across a mobile network.

28 Claims, 8 Drawing Sheets

MECHANISMS FOR POLICY BASED UMTS QOS AND IP QOS MANAGEMENT IN MOBILE IP NETWORKS

FIELD OF THE INVENTION

The present invention relates to mobile IP networks, and more particularly to consistent QoS management between UMTS QoS and IP QoS across mobile IP networks.

BACKGROUND OF THE INVENTION

The development of mobile communication devices and mobile networks has advanced at a rapid rate. At first, analog mobile networks enabled voice communication and simple paging features. Later, digital mobile networks provided more advanced features for voice and data communication, such as encryption, caller identification and short message service (SMS) text messages. More recently, third generation (3G) mobile IP network technology is being developed to enable users to easily access content rich media, information and entertainment with mobile devices.

As mobile devices and mobile networks have advanced, and more data has become available to the users, service providers have started offering different levels of service to their users based on need. For example, a business may need a higher level of service for a financial transaction than an individual subscriber may need to play a game. The different service classes can also help service providers utilize the available bandwidth on the network most efficiently. Additionally, service classes enable a service provider to set a minimum level of quality-of-service (QoS) for their users.

In 3G mobile networks, at least two different layers of QoS may need to be managed in an IP based core network. These two layers include a Universal Mobile Telecommunication System (UMTS) layer QoS and an IP layer Diffserv QoS. UMTS layer QoS will use the service provided by the IP layer Diffserv QoS. A consistent mapping between these two QoS layers is critical for achieving end-to-end QoS. In the past, methods for mapping between these two QoS layers have been limited and difficult to implement.

Some networking products have hard-coded mapping rules between the UMTS QoS layer and the IP QoS layer in a Serving General Packet Radio Service Support Node (SGSN) and a Gateway General Packet Radio Service Support Node (GGSN) disposed within a mobile network. However, this approach limits the mapping to a predefined set of rules.

What is needed is a way to easily provide end-to-end QoS consistently across the UMTS layer and the IP layer on a mobile network. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to one aspect of the invention, mapping mechanisms for the UMTS layer QoS to the IP layer QoS for a mobile network are provided. A policy server maintains the mapping mechanism and is coupled to the support nodes on the mobile network. The policy server is responsible for distributing the mapping rules to the support nodes across the mobile network.

According to another aspect of the invention, three mapping mechanisms are used by the policy server and support nodes, including an out-sourcing mechanism, a provisioning mechanism, and a hybrid mechanism. The out-sourcing mechanism uses the policy server to handle all Packet Data Protocol (PDP) context events and supplies the appropriate rules to the appropriate support node. Under the provisioning mechanism, the policy server pushes down the corresponding mapping rules to each support node across the mobile network in advance of any PDP context event. The hybrid mechanism utilizes a combination of the out-sourcing mechanism and the provisioning mechanism. The mechanisms ensure consistent UMTS to IP QoS mapping across networks and provide many advantages.

According to yet another aspect of the invention, the out-sourcing mechanism is directed at providing many advantages. For example, the policy server can host more complicated mapping rules, as compared to the support nodes, since the policy server makes the decisions relating to the PDP context event. Therefore, the support nodes on the mobile network do not store or execute complex logic. Additionally, since the SGSNs and GGSNs obtain their mapping rules from a policy server, the QoS may be consistent for the user.

According to still yet another aspect of the invention, the provisioning mechanism is directed at providing many advantages. The policy server is not involved in making call-by-call decisions once the mapping rules are pushed to the support node thereby saving policy server resources. Additionally, the mapping rules do not need to be pushed down in real time thereby saving processing power, bandwidth, and reliability demands relating to the policy server.

According to yet another aspect of the invention, the hybrid mechanism is directed at providing many advantages. The hybrid mechanism maintains a balance between scalability and simplicity. In the case of a roaming user, the user specific mapping rules may be pushed down to the user' primary SGSN and GGSN as default rules. When the user roams and other SGSNs and GGSNs are used to handle the traffic, these support nodes may query the policy server to download the relevant mapping rules for the user. Additionally, complicated rules may be maintained by the policy server, thereby freeing some resources for the support nodes.

According to another aspect of the invention, the mapping rules may be generated using attributes in the QoS profile and the Mobile Station Integrated Services Digital Network (MSISDN) number that are carried in a PDP context. The relevant QoS profile attributes may include, among others, traffic class, maximum bit rate, guaranteed bit rate, transfer delay, traffic handling priority, and allocation/retention priority.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term support node refers to both "GGSN" and "SGSN" nodes. The term "PDP context event" refers to any Packet Data Protocol (PDP) context activation, deactivation, or modification procedure. The term "user" refers to any person or customer such as a business or organization that employs a mobile device to communicate or access resources over a mobile network. The term "operator" refers to any technician or organization that maintains or services a mobile network. The term "identifier" includes an MSISDN number, an IP address, or any other information that relates to the location or identity of the user. The term "known" or "knows" refers to local storage at a node or other network node to which the term "known" or "knows" is used with. Referring to the drawings, like numbers indicate like parts throughout the views. Additionally, a reference to the singular includes a reference to the plural unless otherwise stated or is inconsistent with the disclosure herein.

Illustrative Operating Environment

Figure 1:
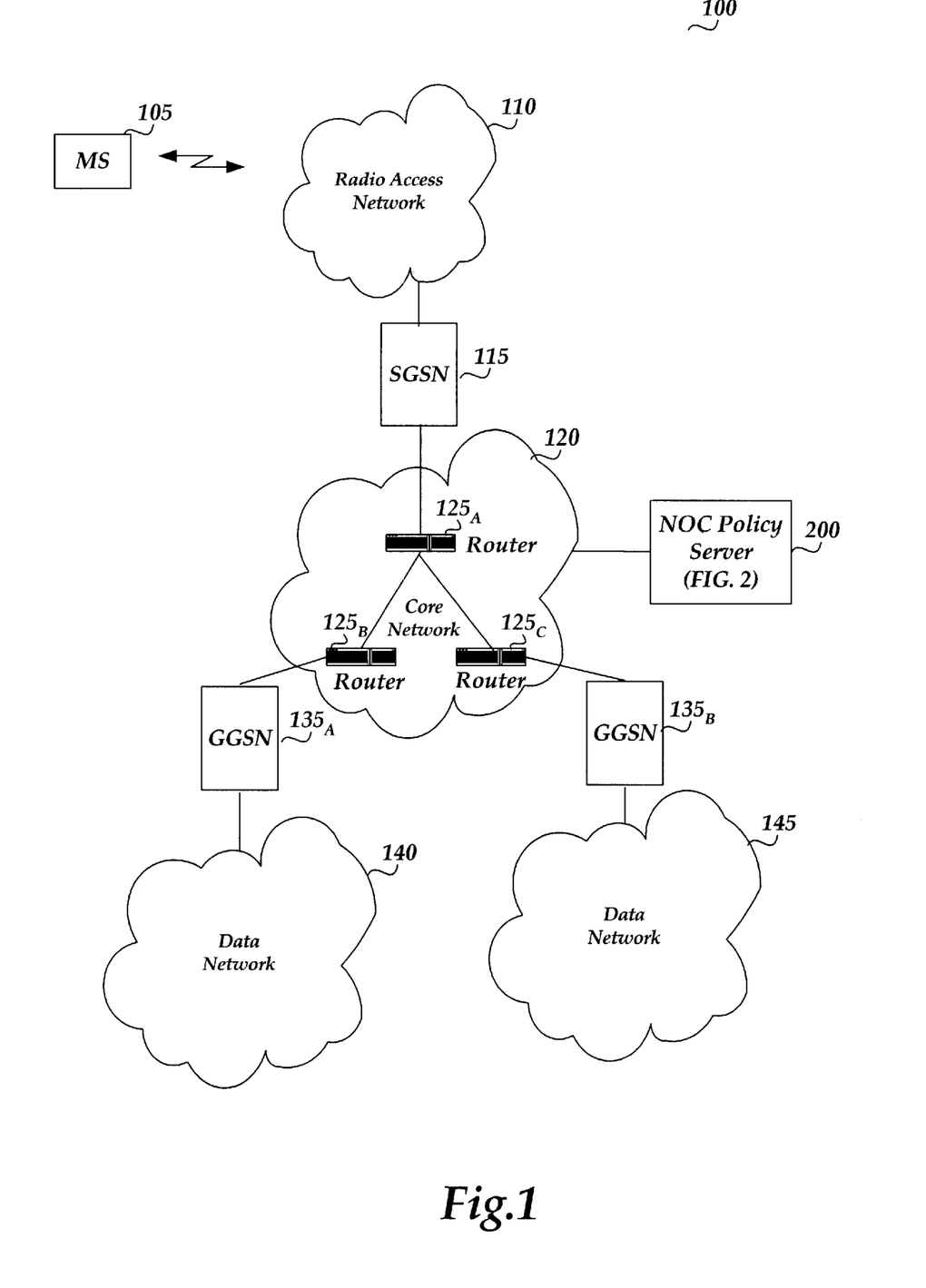
FIG. 1 illustrates an exemplary mobile IP network in which the invention may operate.

With reference to FIG. 1, an exemplary mobile IP network in which the invention may operate is illustrated. As shown in the figure, mobile IP network 100 includes mobile station (MS) 105, radio access network 110, SGSN 115, core network 120, routers $125_{A-C}$, policy server 200 residing in Network Operation Center (NOC), GGSNs $125_{A-B}$, data network 140, and data network 145.

The connections and operation for mobile IP network 100 will now be described. MS 105 is coupled to radio access network 110. Generally, MS 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. MS 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio access network 110 transports information to and from devices capable of wireless communication, such as MS 105. Radio access network 110 may include both wireless and wired components. For example, radio access network 110 may include a cellular tower that is linked to a wired telephone network. Typically, the cellular tower carries communication to and from cell phones, pagers, and other wireless devices, and the wired telephone network carries communication to regular phones, long-distance communication links, and the like.

Some nodes may be General Packet Radio Service (GPRS) nodes. For example, Serving GPRS Support Node (SGSN) 115 may send and receive data from mobile stations, such as MS 105, over radio access network 110. SGSN 115 also maintains location information relating to MS 105. SGSN 115 communicates between MS 105 and Gateway GPRS Support Node (GGSN)s $135_{A-B}$ through core network 120. According to one embodiment of the invention, the Internet Engineering Task Force (IETF) standard Common Open Policy Service (COPS) protocol is used for communication between the support nodes and Network Operations Center (NOC) policy server 200. On a PDP context event, SGSN 115 checks that MS 105 is allowed to activate the desired context and may modify the PDP context. SGSN 115 is provided with the mapping rules from policy server 200 to handle the PDP context event. A PDP context event could be an activation, deactivation, or modification procedure relating to MS 105. Generally, a PDP context event occurs when MS 105 informs radio access network 110 that it wants to activate on a PDP context.

Core network 120 is an IP packet based backbone network that includes routers, such as routers $125_{A-C}$, to connect the support nodes in the network. Routers are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow MS 105 to access network 140 and network 145.

NOC policy server 200 is coupled to core network 120 through communication mediums. Policy server 200 may be programmed by an operator with mapping rules to manage the UMTS quality-of-service (QoS) to IP QoS mapping for mobile IP network 100. More specifically, the operator may generate the mapping rules that are used by the support nodes on mobile IP network 100 to help ensure end-to-end QoS. These mapping rules are supplied to the support nodes by policy server 200. Policy server 200 may use any one of several QoS mapping mechanisms to generate the mapping rules and provide the rules to the support nodes. These mechanisms include an out-sourcing mechanism, a provisioning mechanism, and a hybrid mechanism (See FIGS. 3–8 and related discussion below).

Instead of just being able to map UMTS classes into Diffserv classes, the operator can differentiate the services according to other attributes in a QoS profile for a particular user or group of users. For example, conversational traffic from user group A may be carried with an Expedited Forwarding (EF) class, whereas conversational traffic from user group B may be carried with an Assured Forwarding (AF) class. The specific user of MS 105 may be differentiated into one of these user groups by the user Mobile Station Integrated Services Digital Network (MSISDN) number that is known to both the SGSN and the GGSN support nodes.

Utilizing a policy server to help ensure end-to-end QoS has many advantages. Operators have the flexibility to provide different QoS for the same application traffic. For example, conversational traffic may be mapped into either the EF class or AF class at the core network. The operator may employ a different charging structure for each class. Also, operator workload may be reduced. The operator may configure the mapping rules once at the policy server instead of individually configuring support nodes across the mobile IP network. The policy server may then distribute the mapping rules across the mobile IP network. Additionally, since the mapping rules are generated and come directly from the policy server, the UMTS QoS to IP QoS mapping is consistent across the mobile IP network. The mapping rules may use the relevant attributes in the QoS profile and an identifier that are carried in a PDP context. According to one embodiment of the invention, the MSISDN number is used as the identifier for the user. The relevant attributes may include, among others, traffic class, maximum bit rate, guaranteed bit rate, transfer delay, traffic handling priority, and allocation/retention priority. The source or destination MSISDN number may contain wild cards, in which case the QoS profile attributes determine the Differentiated Services Code Point (DSCP). In addition to the DSCP, the mapping rule may also include metering parameters and out profile actions. The metering parameters can be parameters such as mean rate, burst size, and peak rate. The out profile actions may include actions such as drop, shape, and re-mark.

The DSCP field in the IP packet-header is used to classify the packet into a class to help ensure end-to-end QoS. DSCP may be a six-bit field in an IP packet header that defines classes of service. DSCP and other QoS mechanisms help service providers to allocate their resources on a mobile IP network, such as bandwidth, on a packet-by-packet basis to meet user requirements. Policy server 200 may supply mapping rules to the support nodes to change the DSCP bits to maintain QoS based on the service level agreements (SLAs) with a particular user. Additionally, routers $125_{A-C}$ may act on the DSCP bits to maintain the QoS for the user. An exemplary policy server is described in more detail in conjunction with FIG. 2.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
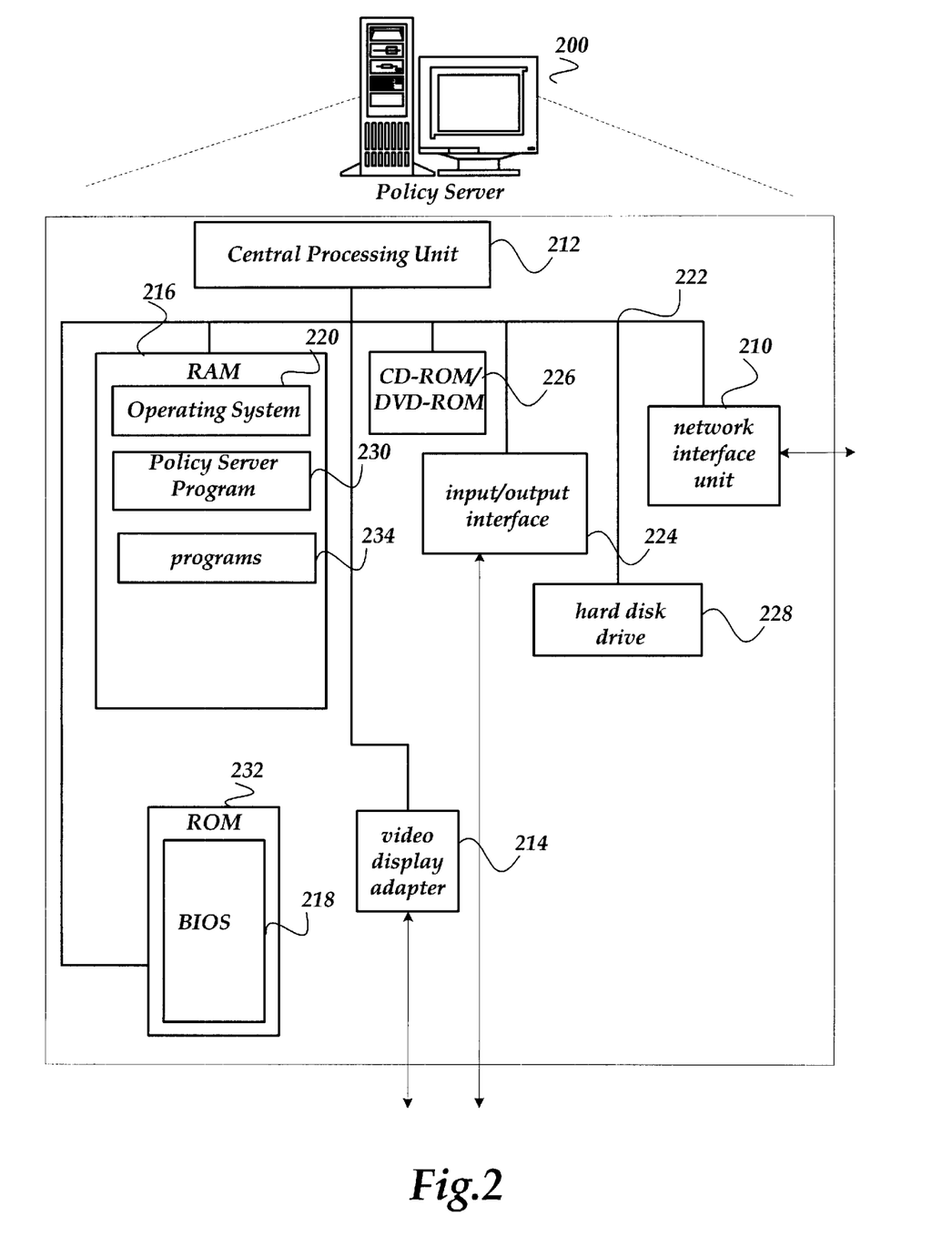
FIG. 2 is a schematic diagram that shows an exemplary policy server that is operative to provide mapping rules to both SGSNs and GGSNs across the mobile IP network.

FIG. 2 is a schematic diagram that shows an exemplary policy server that is operative to provide mapping rules to both SGSNs and GGSNs across the mobile IP network. Accordingly, policy server 200 may receive and transmit data relating to the mapping rules. For instance, policy server 200 may transmit mapping rules and receive data from the SGSNs and GGSNs on the mobile IP network.

Policy server 200 may include many more components than those shown in FIG. 2. However, the components shown are sufficient to disclose an illustrative embodiment for practicing the present invention. As shown in FIG. 2, policy server 200 is connected to core network 120, or other communications network, via network interface unit 210. Network interface unit 210 includes the necessary circuitry for connecting policy server 200 to core network 120, and is constructed for use with various communication protocols including the COPS protocol that runs on top of TCP. Other communications protocols may be used, including, for example, UDP protocols. Typically, network interface unit 210 is a card contained within policy server 200.

Policy server 200 also includes processing unit 212, video display adapter 214, and a mass memory, all connected via bus 222. The mass memory generally includes RAM 216, ROM 232, and one or more permanent mass storage devices, such as hard disk drive 228, a tape drive, CD-ROM/DVD-ROM drive 226, and/or a floppy disk drive. The mass memory stores operating system 220 for controlling the operation of policy server 200. This component may comprise a general purpose server operating system 220 as is known to those of ordinary skill in the art, such as UNIX, LINUX™, or Microsoft WINDOWS NT®. Basic input/output system ("BIOS") 218 is also provided for controlling the low-level operation of policy server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for policy server program 230 (See Figures and Related discussion below), and programs 234. Policy server program 230 includes computer executable instructions which, when executed by policy server computer 200, maintain QoS rule consistency across the UMTS layer and the IP layer. Policy server 200 may include a JAVA virtual machine, an HTTP handler application for receiving and handing HTTP requests, JAVA applets for transmission to a WWW browser executing on a client computer, an IPsec handler, a Transport Layer Security (TLS) handler and an HTTPS handler application for handling secure connections. Either the IPsec handler or the TLS handler may be used to provide security protection for the COPS protocol. HTTPS handler application may be used for communication with external security applications (not shown), to send and receive private information in a secure fashion.

Policy server 200 also comprises input/output interface 224 for communicating with external devices, such as a mouse, keyboard, scanner, or other input devices not shown in FIG. 2. Likewise, policy server 200 may further comprise additional mass storage facilities such as CD-ROM/DVD-ROM drive 226 and hard disk drive 228. Hard disk drive 228 is utilized by policy server 200 to store, among other things, application programs, databases, and program data used by policy server program 230. For example, QoS mapping rules, user databases, relational databases, and the like, may be stored.

Policy-Based Mechanisms

Figure 3:
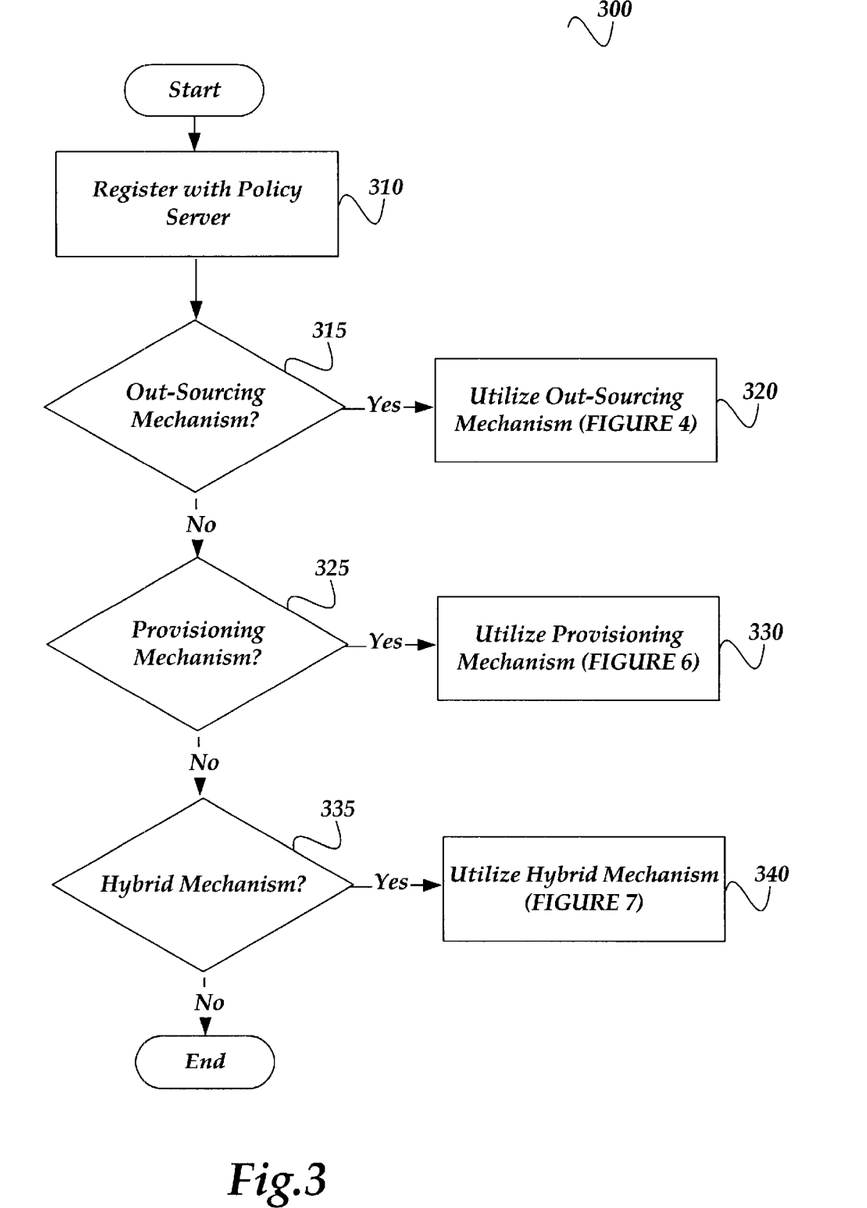
FIG. 3 illustrates an overview of a process for implementing a policy-based mechanism that deploys a mapping policy on the support nodes across the network.

FIG. 3 illustrates an overview of a policy server 300 process for implementing a policy-based mechanism that deploys a mapping policy on the support nodes across the network. After a start block, the process moves to block 310 at which point the support nodes on the network register with the policy server. According to one embodiment of the invention, on boot up, each of the SGSNs and GGSNs register with the policy server as specified by the IETF COPS protocol. Registration may be performed using a different protocol. Transitioning to decision block 315, a determination is made as to whether to use the out-sourcing mechanism (See FIG. 4 and related discussion).

Generally, when an out-sourcing mechanism is selected, the support nodes query the policy server for the mapping rules to handle all PDP context events. When the out-sourcing mechanism is selected, the process moves to block 320 where the out-sourcing mechanism is utilized by the policy server. When the out-sourcing mechanism is not chosen, the process moves to decision block 325 to determine whether to use the provisioning mechanism (See FIG. 6 and related discussion). Generally, under the provisioning mechanism the policy server pushes down the corresponding mapping rules to each support node across the network in advance of any PDP context event. When the provisioning mechanism is selected at the provisioning decision block 325, the process moves to block 330, at which point the provisioning mechanism is carried out. When the provisioning mechanism is not selected, the process moves to decision block 335, where the determination is made as to whether to use the hybrid mechanism. Generally, the hybrid mechanism utilizes a combination of the out-sourcing mechanism and the provisioning mechanism (See FIG. 7 and related discussion). When the hybrid mechanism is selected, the process moves to block 340 where the hybrid mechanism is utilized. The process then steps to an end block and returns to processing other actions.

Figure 4:
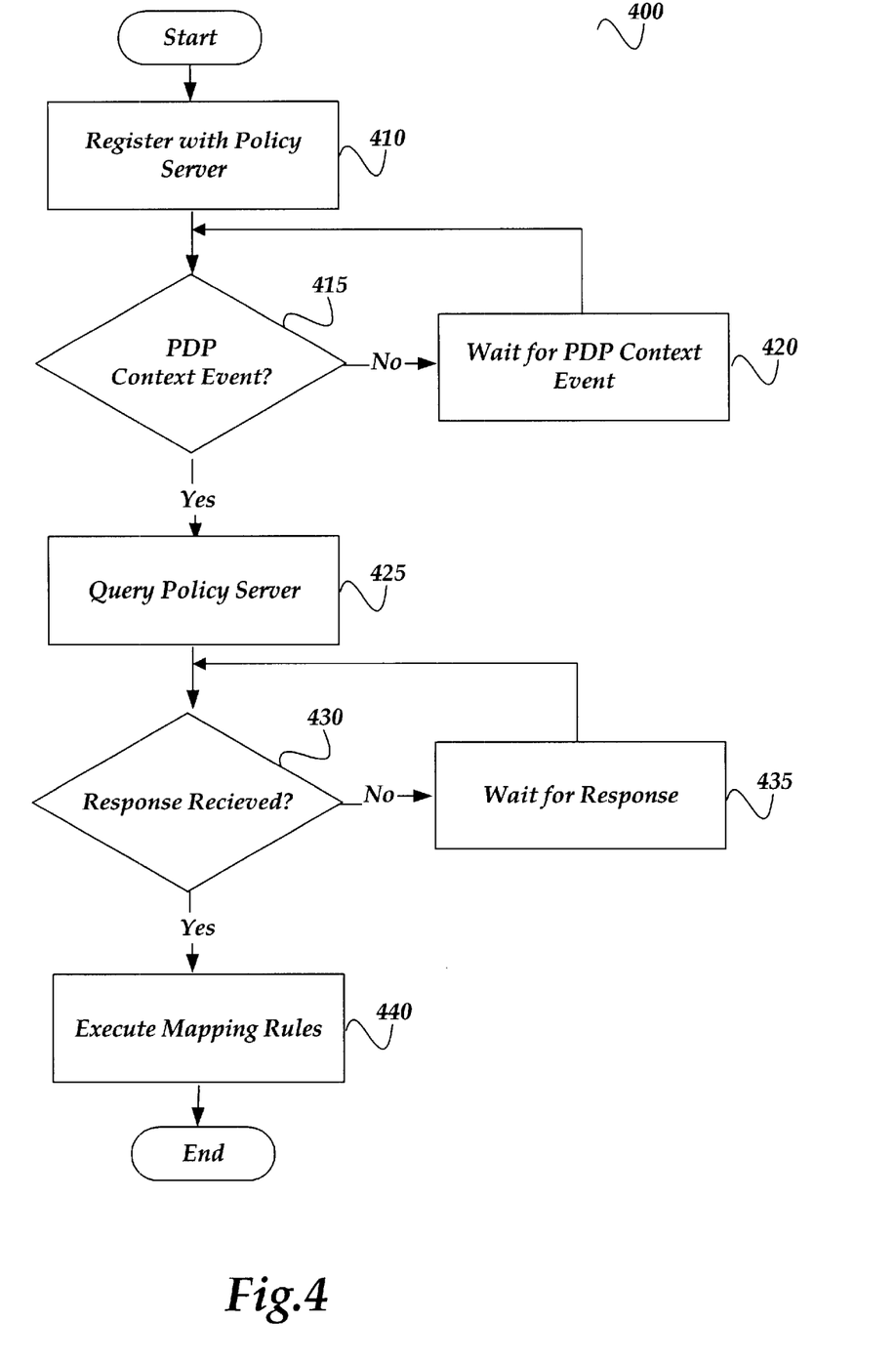
FIG. 4 shows a logical flow for utilizing the out-sourcing mechanism.

FIG. 4 shows a process for utilizing the out-sourcing mechanism. For exemplary purposes, the process for a single support node will be described. After a start block, the process transitions to block 410 where a support node registers with the policy server. Transitioning to decision block 415, a determination is made at the support node as to whether a PDP context event has occurred. When a PDP context event has not occurred, the process moves to block 420, at which point the logic waits for a PDP context event. When a PDP context event has occurred, the process flows to block 425, where the support node that received the PDP context event queries the policy server for the corresponding mapping rules relating to how to handle the event. Moving to decision block 430, the support node determines if a response is received from the policy server containing the mapping rules. When a response has not been received from the policy server, the support node waits for a response (block 435). When a response has been received from the policy server, the process advances to block 440 where the mapping rules are executed by the support node. Next, the process moves to the end block and returns to processing other actions.

The policy server can host more complicated mapping rules, as compared to the support nodes, since the policy server makes the decisions relating to the event. Therefore, the support nodes on the network do not need to store or execute complex logic. Additionally, the out-sourcing mechanism has advantages for a user that is roaming. Since the SGSNs and GGSNs obtain their mapping rules from a policy server, the QoS may be consistent for the user. For example, when a user roams within their home mobile network, the same policy server may be queried when a PDP context event occurs. When a user is roaming outside of their home mobile network, the user's home mobile network policy server could be contacted to determine the appropriate mapping rules.

Figure 5:
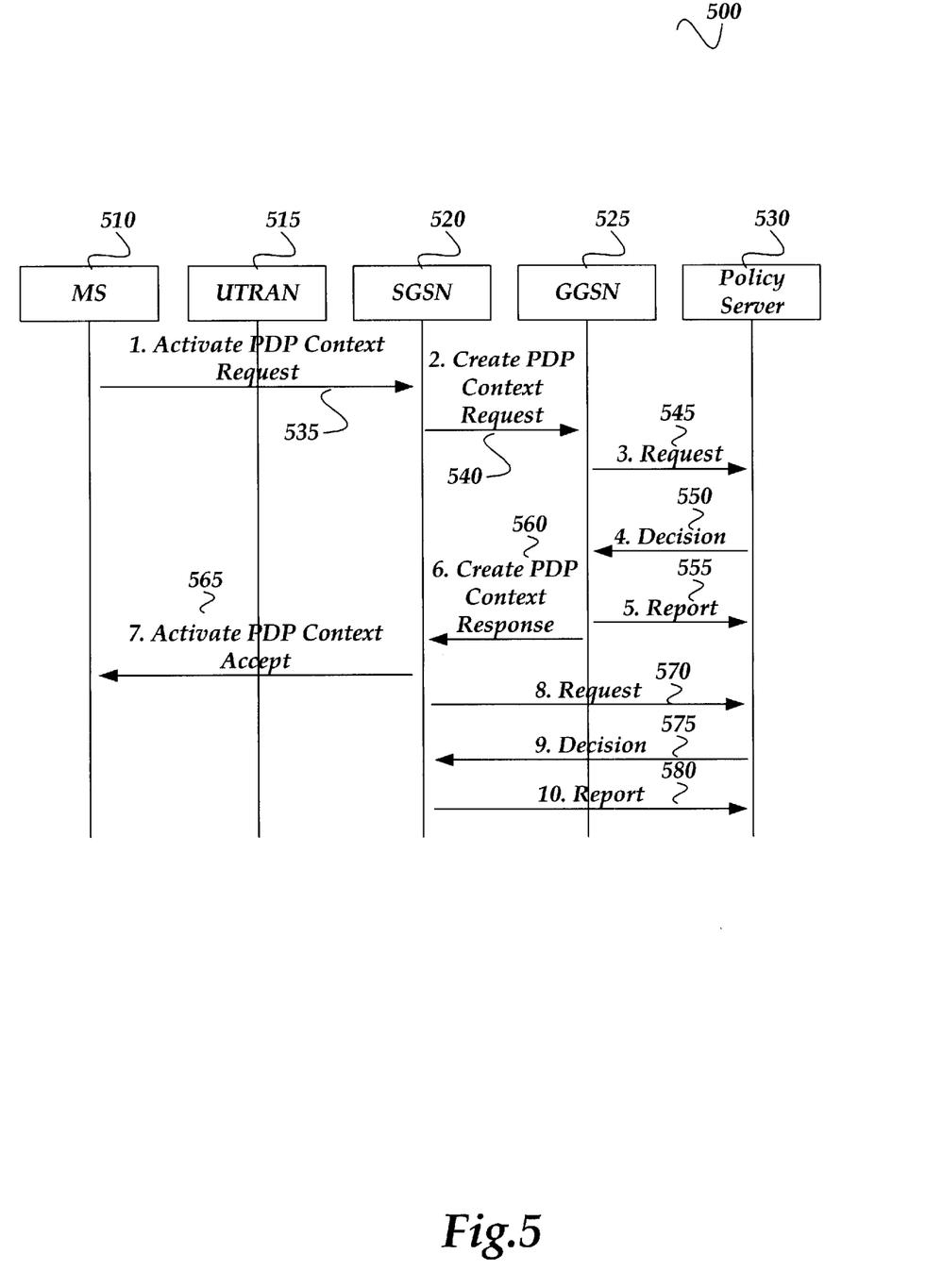
FIG. 5 illustrates exemplary message flows for a PDP event and out-sourcing message flow.

FIG. 5 illustrates exemplary message flows 500 for a PDP context event and out-sourcing message flow. As shown in the figure, message flow 500 includes MS 510, UMTS Terrestrial Radio Access Network (UTRAN) 515, SGSN 520, GGSN 525, and policy server 530, arranged in the corresponding order as listed. MS 510, UTRAN 515, SGSN 520, GGSN 525, and policy server 530 may be starting and ending points for the messages. Ten exemplary message flows will now be described. First, MS 510 sends an "Activate PDP Context Request" message 535 to SGSN 520. Second, SGSN 520 sends a "Create PDP Context Request" message 540 to GGSN 525. Third, GGSN 525 sends a "Request" message 545 to policy server 530. Fourth, policy server 530 sends a "Decision" message 550 to GGSN 520. Fifth, GGSN 525 sends a "report" message 555 back to policy server 530. Sixth, GGSN 525 sends a "Create PDP Context Response" message 560 to,SGSN 520. Seventh, SGSN 520 sends an "Activate PDP Context. Accept" message 565 to MS 510. Eighth, SGSN 520 sends a "Request" message 570 to policy server 530. Ninth, policy server 530 sends a "Decision" message 575 to SGSN 520. Finally, tenth, SGSN 520 sends a "Report" message 580 back to policy server 530.

In the request messages (the third message 545 and the eighth message 570), SGSN 520 and GGSN 535 include the MSISDN number and the relevant QoS attributes that relate to MS 510. The request messages also include a handle that uniquely identifies the PDP context event. The decision messages (the fourth message 550 and the ninth message 575) include a DSCP calculated with the operator specified rules obtained from policy server 530. When the PDP context event is a deactivation procedure, both SGSN 520 and GGSN 525 send a delete request message to policy server 530. The delete request message informs the policy server that the PDP context does not exist anymore.

Figure 6:
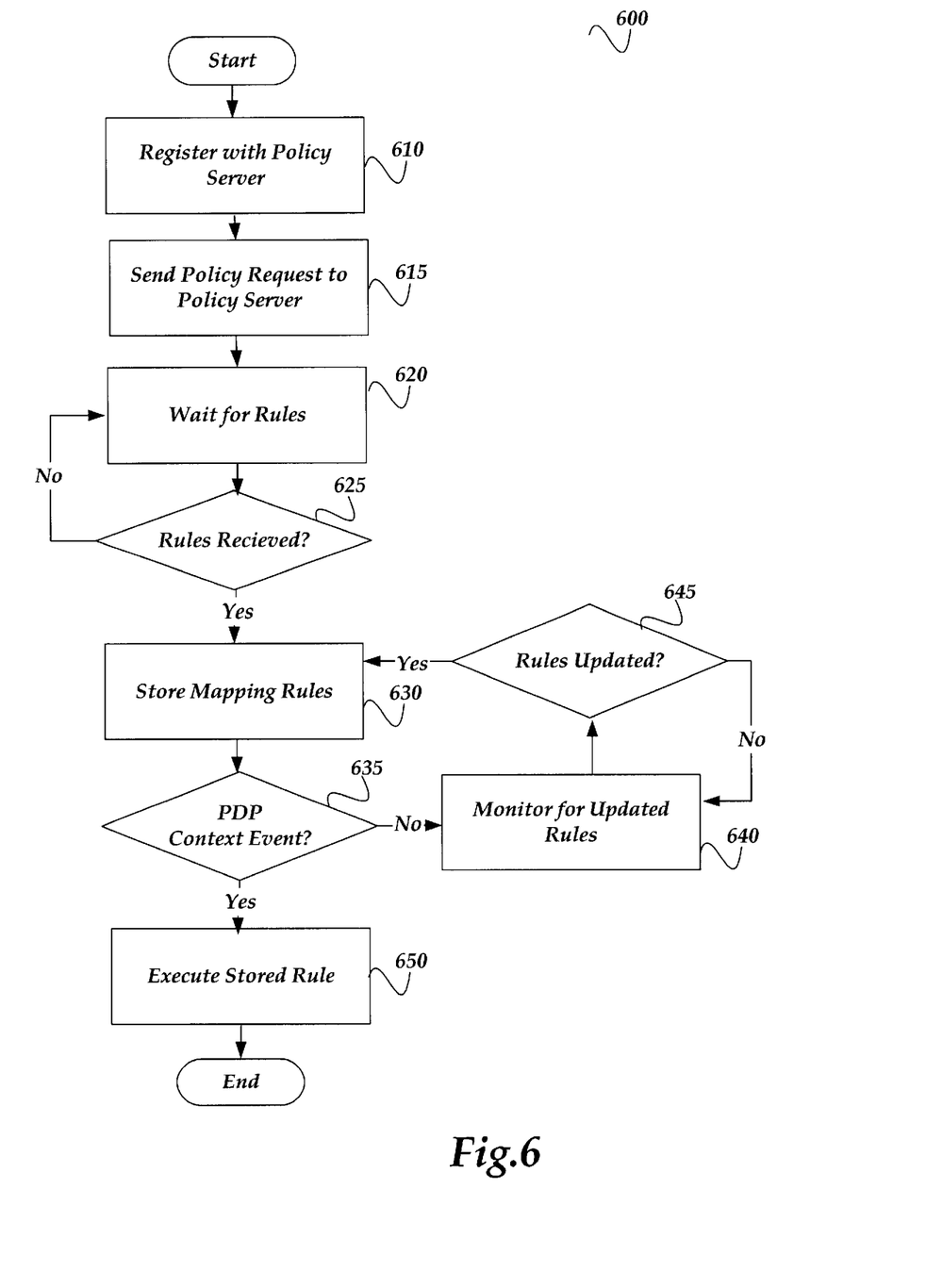
FIG. 6 shows a logical flow utilizing the provisioning mechanism.

FIG. 6 shows a process for a provisioning mechanism 600 on a supporting node. After a start block, the process moves to block 610 where a support node registers with the policy server on boot up. After registering with the policy server, the support node sends a policy request 615 to the policy server requesting mapping rules. Moving to block 620, the support node waits to receive the mapping rules from the policy server. Transitioning to decision block 625, a determination is made as to when the mapping rules are received. When the mapping rules have not been received, the logical flow returns to block 620. When the mapping rules have been received, the mapping rules are stored 630 by the support node. Transitioning to decision block 635, a determination is made as to whether a PDP context event has occurred. When a PDP context event has occurred, the logic flows to block 650, where the mapping rules appropriate for the PDP context stored rule are executed. For example, the support node may compute the DSCP according to the mapping rules obtained from the policy server.

Otherwise, the process flows to block 640, at which point the process monitors for updated rules sent to the support node by the policy server. Stepping to decision block 645, a determination is made as to whether updated mapping rules have been pushed down by the policy server to the support node. When updated mapping rules have been received, the process returns to block 630, at which point the updated mapping rules are stored. Otherwise, the process returns to block 640 to continue monitoring. The process then steps to an end block and returns to processing other actions.

The provisioning mechanism has several advantages. The policy server is not involved in making call-by-call decisions once the mapping rules are pushed to the support node thereby saving policy server resources. Additionally, the mapping rules do not need to be pushed down in real time thereby saving processing power, bandwidth, and reliability demands relating to the policy server.

Figure 7:
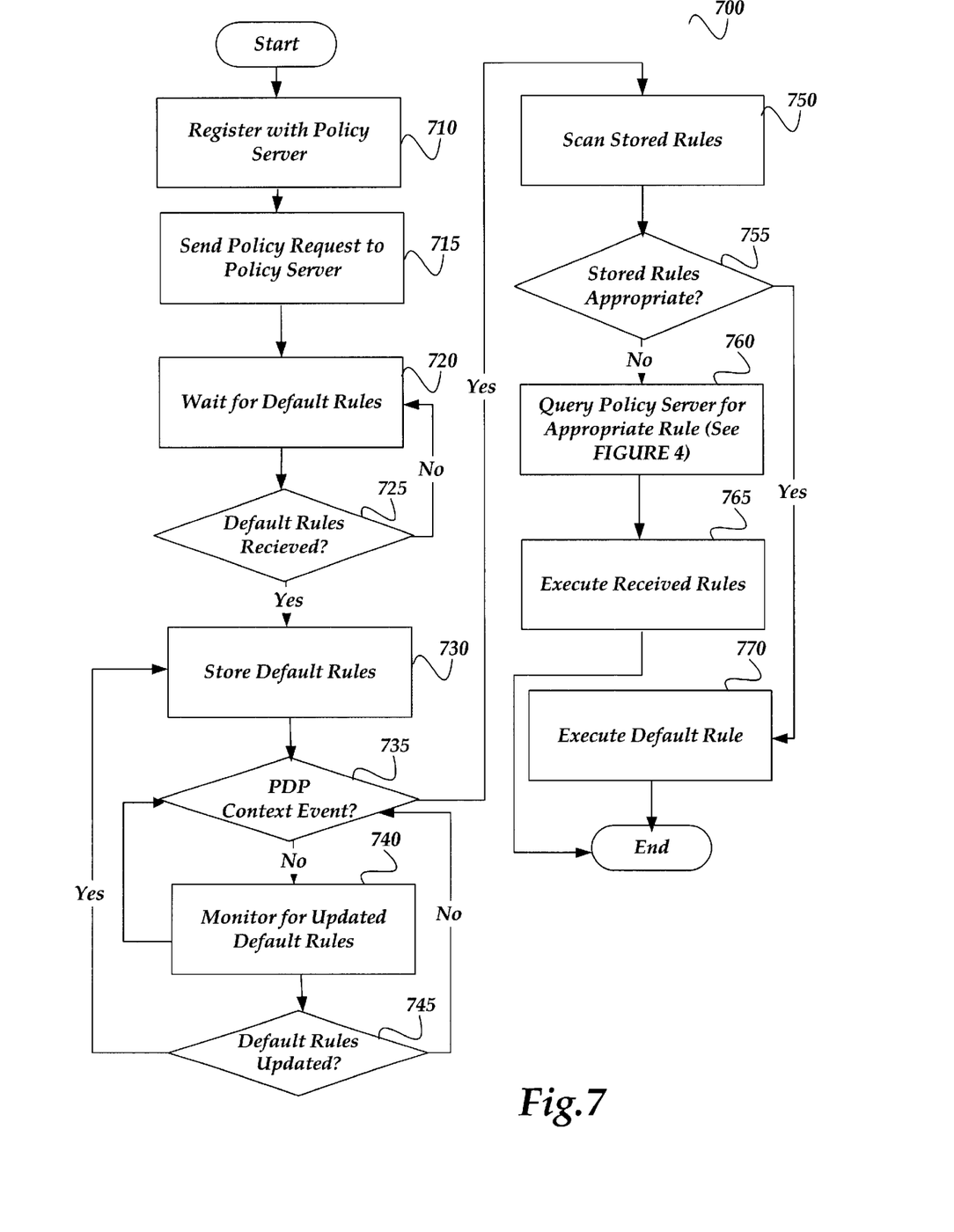
FIG. 7 illustrates a logical flow for a hybrid mechanism that utilizes both the out-sourcing mechanism and the provisioning mechanism.

FIG. 7 illustrates a process for a hybrid mechanism 700 on a supporting node that utilizes both the out-sourcing mechanism and the provisioning mechanism. After a start block, the logical flow moves to block 710 a support node registers with the policy server. After registering with the policy server, the support node sends a policy request to the policy server requesting default mapping rules (block 715). Moving to block 720, the support node waits to receive default mapping rules. Transitioning to decision block 725, a determination is made as to when the default mapping rules are received. When the default rules have not been received the process returns to block 720 to continue waiting. When the default rules have been received, the default mapping rules are stored 730 by the support node. Stepping to decision block 735, a determination is made as to whether there is an incoming PDP context event. When a PDP context event has not occurred, the process flows to block 740, at which point the process monitors for updated default rules. Stepping to decision block 745, a determination is made as to whether updated default mapping rules have been pushed down by the policy server to the support node. When default updated mapping rules have been received, the process returns to block 730, at which point the updated default mapping rules are stored. Otherwise, the process returns to decision block 735 to determine when a PDP context event occurs. When a PDP context event has occurred, the default rules stored on the support node are scanned by the process at block 750. Moving to decision block 755, a determination is made as to whether any of the default rules are appropriate for the PDP context. When the default rules are not appropriate for the PDP context, the logical flow moves to block 760, at which point the support node queries the policy server using the out-sourcing mechanism (See FIG. 4 and related discussion). The process moves to block 765, at which point the mapping rule or mapping rules received from the policy server is executed. When the default rules are appropriate, the process moves to block 770 where the default rule is executed by the support node. The process then steps to an end block and returns to processing other actions.

The hybrid mechanism maintains a balance between scalability and simplicity. In the case of a roaming user, the user specific mapping rules may be pushed down to the user's primary SGSN and GGSN as default rules. When the user roams and other SGSNs and GGSNs are used to handle the traffic, these support nodes may query the policy server to download the relevant mapping rules for the user. Additionally, complicated rules may be maintained by the policy server, thereby freeing some resources for the support nodes.

Figure 8:
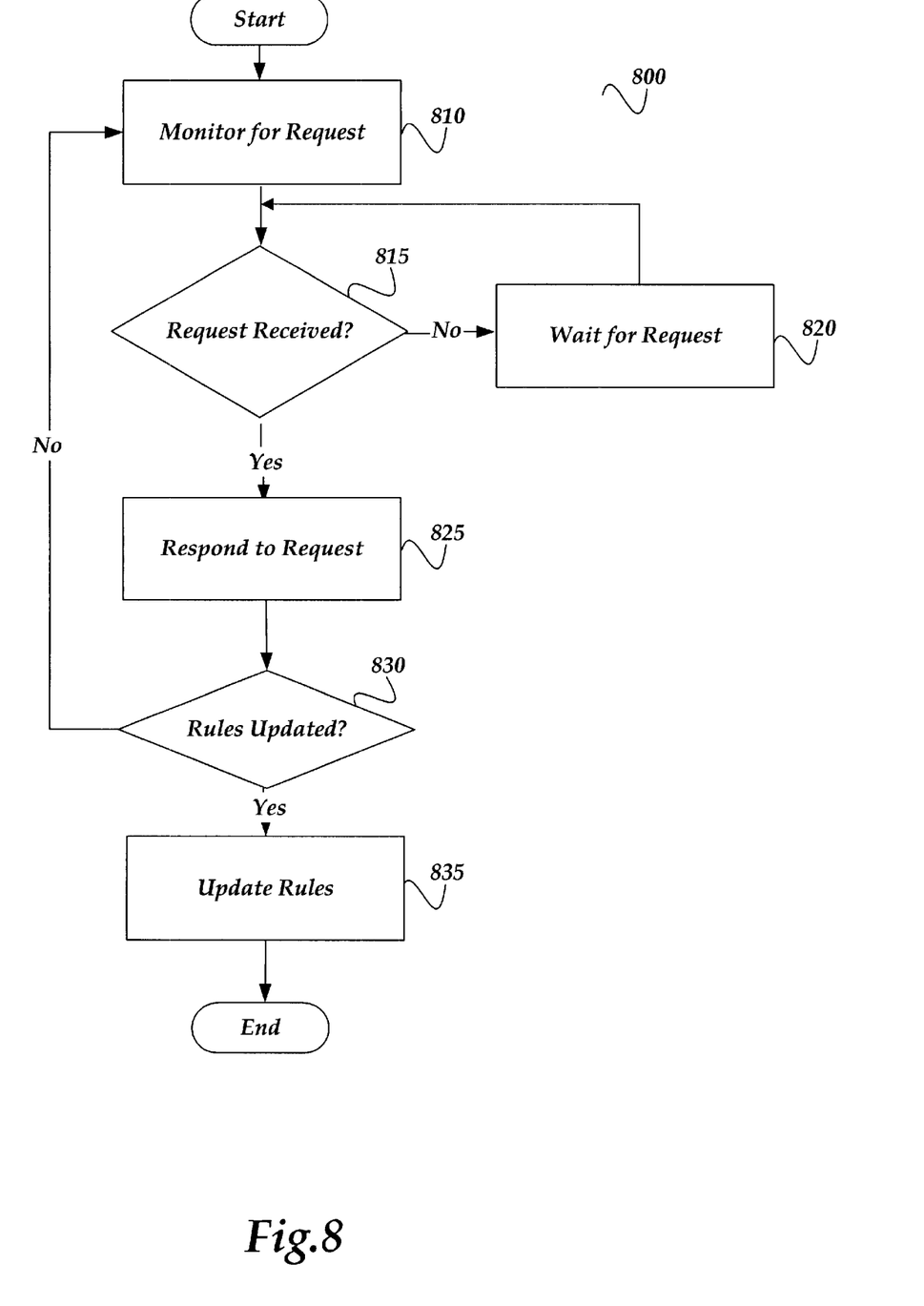
FIG. 8 illustrates a logical flow of a policy server responding to support nodes on the network, in accordance with aspects of the invention.

FIG. 8 illustrates a process 800 for a policy server to respond to support nodes on a mobile IP network. After a start block, the process moves to block 810, where the policy server waits for a request from a support node. The request may be an initialization request for registration, a termination request, or a policy request. Transitioning to decision block 815, a determination is made as to whether a request has been received. When a request has not been received, the process moves to block 820 where the policy server waits for a request. When a request has been received, the policy server responds to the request 825. When the out-sourcing mechanism is selected, the appropriate mapping rules are pushed to the support node for each PDP context event. When the provisioning mechanism is selected, the mapping rules currently on the policy server for the support node are pushed down. When the hybrid mechanism is selected, default rules are pushed down to the support node. Under the hybrid mechanism, the policy server also responds to any request by a support node that does not have a rule that corresponds to a PDP context that it has received.

Moving to decision block 830, a determination is made as to whether the mapping rules are updated. The operator may update the mapping rules on the policy server at any time. When the mapping rules are updated, the process moves to block 835 where the rules are updated. When the rules are updated on the policy server and the provisioning mechanism is selected the updated rules are pushed to the affected support nodes on the network. When the hybrid mechanism is selected, and the updated rules affect the default rules, then the updated rules are pushed to the affected support nodes on the network. When the rules are not updated the process returns to block 810 to monitor for requests. The process advances to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for managing UMTS layer QoS to IP layer QoS mapping rules in a mobile network that includes support nodes, wherein the support nodes include at least one SGSN and at least one GGSN, comprising:
    configuring at least one mapping rule with a policy server; and
    utilizing a policy based management mechanism to provide the at least one mapping rule from the policy server to support nodes on the mobile network for enabling a response to a PDP context event.

2. The method of claim 1, wherein utilizing the policy based management mechanism further comprises selecting at least one policy based management mechanism from an out-sourcing mechanism, a provisioning mechanism, and a hybrid mechanism.

3. The method of claim 2, wherein the out-sourcing mechanism, further comprises:
   determining when the PDP context event occurs, and when the PDP context event occurs:
      querying the policy server from at least one support node for the at least one mapping rule to handle the PDP context event;
      determining when the at least one mapping rule has been received from the policy server to handle the PDP context event; and
      executing the at least one mapping rule on the at least one support node.

4. The method of claim 2, wherein the provisioning mechanism, further comprises:
   registering at least one support node with the policy server;
   sending the policy server a policy request for the at least one mapping rule from the at least one support node;
   storing the at least one mapping rule received from the policy server in the at least one support node; and
   when a PDP context event has occurred relating to the at least one support node, executing the stored at least one mapping rule.

5. The method of claim 4, further comprising:
   monitoring for an updated mapping rule; and
   when the updated mapping rule has been received from the policy server, storing the updated mapping rule.

6. The method of claim 2, wherein the hybrid mechanism, further comprises:
   registering at least one support node with the policy server;
   sending a policy request to the policy server requesting a default mapping rule for the at least one support node;
   storing the default mapping rule in the at least one support node when the default mapping rule is received from the policy server; and
   when a PDP context event occurs relating to the at least one support node:
      scanning the stored default mapping rule;
      determining when the stored default mapping rule is appropriate for the PDP context event relating to the at least one support node; and when:
         executing the default mapping rule;
      and when the PDP context event is not appropriate for the PDP context event:
         querying the policy server for another mapping rule appropriate for the PDP context event; and
         executing the other mapping rule appropriate for the PDP context event when received from the policy server.

7. The method of claim 6, further comprising:
   monitoring for an updated mapping rule; and
   when the updated mapping rule has been received from the policy server, storing the updated mapping rule in the at least one support node.

8. The method of claim 1, wherein generating the at least one mapping rule, further comprises utilizing an identifier and an attribute selected from a QoS profile to generate the at least one mapping rule.

9. The method of claim 8, wherein the attribute is selected from an MSISDN, a traffic class, a maximum bit rate, a guaranteed bit rate, a transfer delay, a traffic handling priority, and an allocation priority.

10. An apparatus for providing mapping rules to manage the mapping between a UMTS layer QoS and an IP layer QoS in a mobile network, wherein the mobile network includes support nodes, wherein the support nodes include at least one SGSN and at least one GGSN, comprising:
    a processor and a computer-readable medium;
    an operating environment executing on the processor from the computer-readable medium;
    a network interface unit arranged to communicate with the support nodes on the network; and
    a policy server program executing under the control of the operating system and operative to perform actions, including:
       storing at least one mapping rule;
       utilizing a mapping mechanism to manage the at least one mapping rule between the UMTS layer QoS and the IP layer QoS; and
       providing the at least one mapping rule to at least one support node on the mobile network.

11. The apparatus of claim 10, wherein utilizing the mapping mechanism to manage the mapping between the UMTS layer QoS and the IP layer QoS, further comprises selecting the mapping mechanism from an out-sourcing mechanism, a provisioning mechanism, and a hybrid mechanism.

12. The apparatus of claim 11, further comprising:
    determining when the at least one mapping rule has been updated; and
    storing an updated mapping rule when updated.

13. The apparatus of claim 12, wherein storing the at least one mapping rule with a policy server, further comprises:
    selecting an attribute from a QoS profile; and
    generating a differentiated services code point in response to the selected attribute and an identifier.

14. The apparatus of claim 13, wherein the attribute is selected from an MSISDN, a traffic class, a maximum bit rate, a guaranteed bit rate, a transfer delay, a traffic handling priority, and an allocation priority.

15. The apparatus of claim 11, wherein the provisioning mechanism, further comprises pushing the at least one mapping rule to at least one support node.

16. The apparatus of claim 15, further comprising:
    determining when the at least one mapping rule has been updated;
    storing an updated mapping rule when updated; and
    pushing the updated mapping rule to at least one support node.

17. The apparatus of claim 11, wherein the hybrid mechanism, further comprises:
    sending a default mapping rule to at least one support node; and
    when the PDP context event occurs relating to the at least one support node that is not handled by the default mapping rule:
       scanning for another mapping rule to handle the PDP context; and
       sending the other mapping rule appropriate for the PDP context event to the at least one support node.

18. The apparatus of claim 17, further comprising:
    determining when the default mapping rule has been updated;
    storing the default mapping rule when updated; and
    pushing an updated default rule to at least one support node.

19. The apparatus of claim 11, wherein the out-sourcing mechanism, further comprises:
   determining when the PDP context event occurs, and when the PDP context event occurs:
      querying the policy server from at least one support node for each mapping rule to handle the PDP context event;
      determining when each mapping rule has been received from the policy server to handle the PDP context event; and
      executing each received mapping rule on the at least one support node.

20. A system for managing QoS mapping rules between two layers on a mobile network, comprising:
   support nodes, wherein the support nodes include at least one SGSN and at least one GGSN; wherein each support node includes a network interface unit arranged to communicate across the mobile network; and
   a policy server that is configured to provide at least one mapping rule to manage the QoS between the two layers on the mobile network, wherein the policy server includes:
      a network interface unit arranged to communicate with the support nodes; and
      a policy server program executing under the control of an operating system and operative to perform actions, including:
         storing the at least one mapping rule relating to managing the QoS mapping between the two layers;
         receiving a request from at least one support node;
         determining the at least one mapping rule; and
         sending the at least one mapping rule to the at least one support node.

21. The system of claim 20, further comprising selecting a mapping mechanism to manage the QoS mapping between the two layers from an out-sourcing mechanism, a provisioning mechanism, and a hybrid mechanism.

22. The system of claim 21, wherein determining the at least one mapping rule further comprises:
   selecting an attribute from a QoS profile; and
   generating the at least one mapping rule using the selected attribute and an identifier.

23. The system of claim 22, wherein the attribute is selected from an MSISDN, a traffic class, a maximum bit rate, a guaranteed bit rate, a transfer delay, a traffic handling priority, and an allocation priority.

24. The system of claim 21, wherein the provisioning mechanism, further comprises pushing the mapping rule to at least one support node.

25. The system of claim 24, further comprising:
   determining when the at least one mapping rule has been updated;
   storing an updated mapping rule when updated; and
   pushing the updated mapping rule to at least one support node.

26. The system of claim 24, wherein the hybrid mechanism, further comprises:
   sending a default mapping rule to at least one support node; and
   when a PDP context event occurs relating to at least one support node that is not handled by the default mapping rule:
      scanning for another mapping rule to handle the PDP context; and
      sending the other mapping rule appropriate for the PDP context event to the at least one support node.

27. The system of claim 26, further comprising:
   determining when the default mapping rule has been updated;
   storing the default mapping rule when updated; and
   pushing an updated default mapping rule to at least one support node.

28. The system of claim 25, wherein the out-sourcing mechanism, further comprises:
   determining when the PDP context event occurs, and when the PDP context event occurs:
      querying the policy server from at least one support node for the at least one mapping rule to handle the PDP context event;
      determining when the at least one mapping rule has been received from the policy server to handle the PDP context event; and
      executing the at least one mapping rule to handle the PDP context event on the at least one support node.

* * * * *